July 19, 1927.  1,636,566
F. G. JOHNSON
AIR GAUGE
Filed Aug. 5, 1925
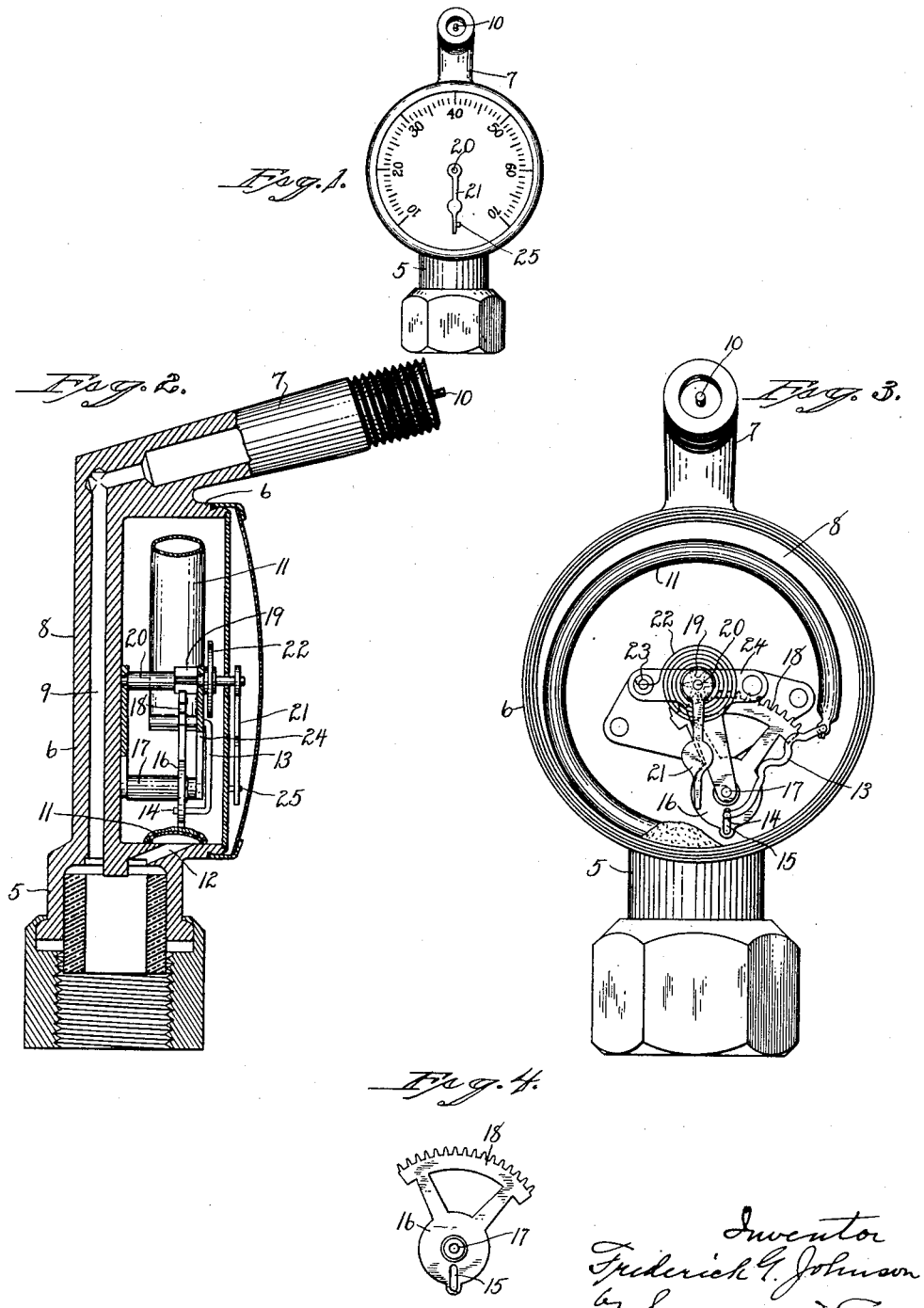

Patented July 19, 1927.

1,636,566

UNITED STATES PATENT OFFICE.

FREDERICK GODFREY JOHNSON, OF NEW HAVEN, CONNECTICUT, ASSIGNOR TO VISIBLE TIRE GAUGE CO., OF NEW HAVEN, CONNECTICUT, A CORPORATION.

AIR GAUGE.

Application filed August 5, 1925. Serial No. 48,190.

Fig. 1 is a face view of an air gauge constructed in accordance with my invention.

Fig. 2 is a vertical, sectional view of the same, on an enlarged scale.

Fig. 3 is a face view, with the dial removed.

Fig. 4 is a plan view of the rack, detached.

This invention relates to an improvement in air gauges, and while particularly adapted for air gauges to be applied to the filling-nipples of automobile tires, is readily adaptable for various other purposes. In assembling tire gauges, provision must be made for adjustments, so the pointer will properly register with the dial at predetermined pressures, and one object of this invention is to provide means for readily making this adjustment. In some forms of wheels, the gauge projects so far toward the hub that access cannot be had for attachment to the pump, and another object of this invention is to provide a tire gauge with a forwardly-projecting stem to which a tire-pump-coupling may be conveniently attached, and the invention consists in the construction as hereinafter described and particularly recited in the claim.

In carrying out my invention, I form the gauge with a base 5 for attachment to a tire-nipple, or other device. Above the base is a housing 6 and projecting forward from the upper end of the housing is a stem 7. Extending from the base upward through the rear wall 8 of the housing and outward through the stem 7, is an air-passage 9. In the stem 7 is the usual valve, not shown, but having a pin 10 projecting beyond the end of the stem 7, which is threaded for coupling with a pump, the valve being opened by inward pressure upon the pin 10. In the housing is a Bourdon tube 11, one end of which is fixed in the housing, over a port 12 opening out of the base 5. The closed end of the tube is soldered to a wire 13, the outer end 14 of this wire being turned inward through a radial slot 15 formed in a disk 16 mounted on a stud 17. This disk is formed with a segmental rack 18 which meshes with a pinion 19 fixed to a central arbor 20, which carries a pointer 21. In one direction, the central arbor 20 turns against the pressure of a spring 22, one end of which is fixed to the arbor, and the other end to a stud 23, the pinion 19 and disk 16 being held in place upon a plate 24. The movement of the pointer 21 is limited in one direction by a pin 25 mounted in a dial 26, which may be suitably graduated.

In order that the pointer may properly register on the dial, according to the amount of pressure, the connection between the end of the Bourdon tube and the disk 16 must be adjustable, and by using a wire this connection can be curved or crimped, so as to shorten it, and by providing the slot 15, the end of this wire may be moved toward or away from the center of the rack-disk, so that the movement of the Bourdon tube, under pressure, will be properly indicated on the dial, it being understood that as air is forced into the tire-tube, or other device, air will pass through the port 12 into the Bourdon tube 11, and tend to straighten it, and this movement is imparted to the rack through the wire-connection 13. The stem 7, projecting forward, is in convenient position for connection with the pump-tube, and by carefully adjusting the coupling-wire 13, the movement of the pointer can be adjusted so as to properly indicate the pressure on the dial.

While air gauges using a Bourdon tube adapted to actuate a pointer to indicate air-pressure are not new, my particular arrangement simplifies the construction by the omission of and simplicity of parts, which leads to lower cost of production and permits of more perfect adjustment of parts, and also leads to a more perfect operation.

I claim:

An air gauge, comprising a housing, a Bourdon tube mounted in the housing, a center arbor, a pinion mounted thereon, a rack meshing with said pinion, said rack provided with an integral central disk formed with a radial slot, and a wire soldered directly to and forming a rigid operative extension of the closed end of the Bourdon tube, and its outer end turned into said slot.

In testimony whereof, I have signed this specification.

FREDERICK GODFREY JOHNSON.